Aug. 29, 1967 T. E. DRAPLIN 3,338,007
MOLDING RETAINER
Filed Dec. 8, 1965
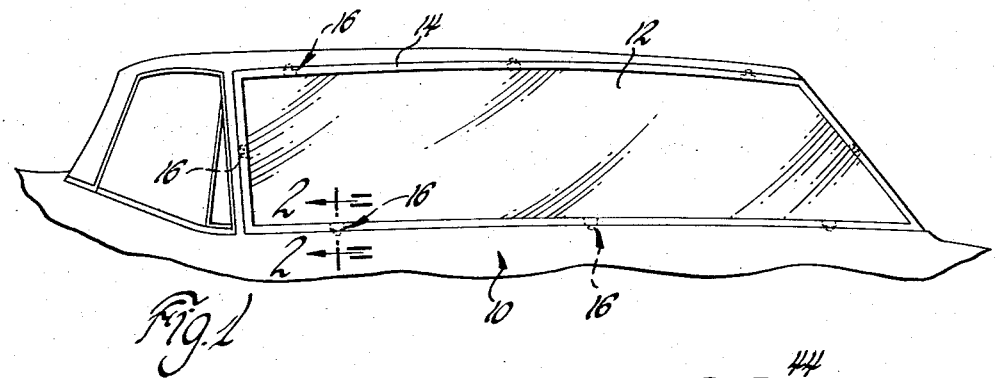
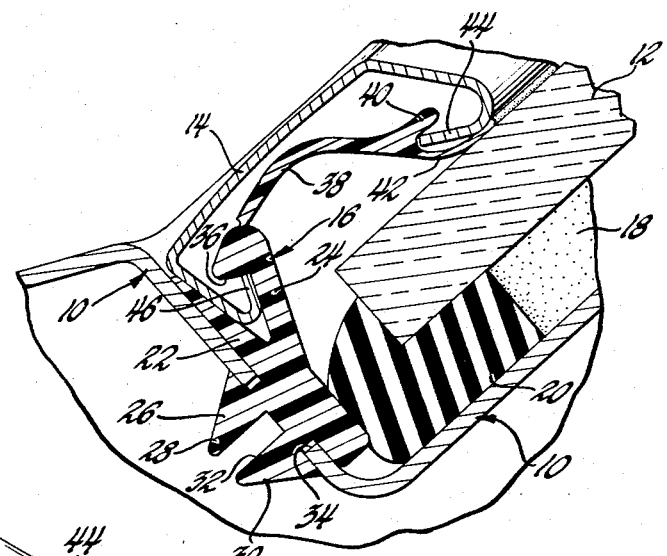
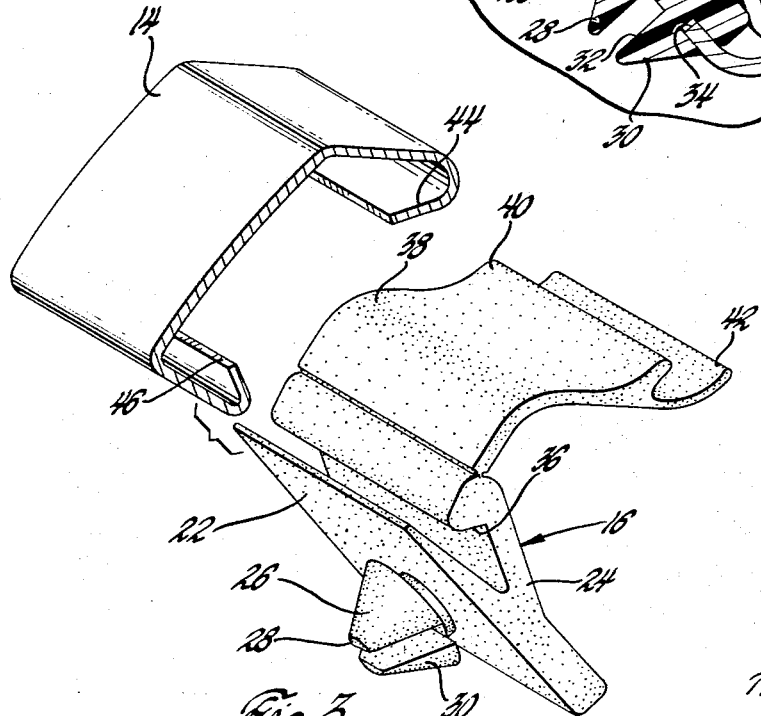
INVENTOR.
Thomas E. Draplin
BY
Paul Fitzpatrick
ATTORNEY United States Patent Office 3,338,007
Patented Aug. 29, 1967

3,338,007
MOLDING RETAINER
Thomas E. Draplin, Southfield, Mich., assignor to General Motors Corporation, Detroit, Mich., a corporation of Delaware
Filed Dec. 8, 1965, Ser. No. 512,324
1 Claim. (Cl. 52—208)

ABSTRACT OF THE DISCLOSURE

An installation of a reveal molding around a window in which the molding has recurved edges. A number of flexible clips retain the molding by engaging its edges, and include cushioning spacers disposed between the molding and the window and frame, respectively. The clips include resilient studs which plug into the window frame.

This invention relates to vehicle bodies and particularly to the mounting of transparent panels such as windshields or rear windows on vehicle bodies. Specifically, it relates to a new fastening means fixing a molding strip around the edge of a transparent panel such as the windshield.

Presently, windshield moldings are fastened to the vehicle body by molding clips which are fastened to the body by screws. This present method requires a great deal of assembly time and as a result is rather expensive.

It is, therefore, an object of this invention to provide a relatively simple and economical means and procedure for fastening a molding strip around the edge of a windshield in a vehicle body.

Other objects, features, and advantages of the subject invention will become obvious upon reference to the following detailed description and the drawings illustrating the preferred embodiment thereof, wherein:

FIGURE 1 is a schematic view of the invention as used in fixing a molding strip around the edge of a windshield in a vehicle body;

FIGURE 2 is a sectional view in the plane of line 2—2 in FIGURE 1; and,

FIGURE 3 is a perspective view of a molding clip and a section of a molding strip embodying the invention.

More specifically, FIGURE 1 shows a vehicle body 10 including a windshield 12 and a molding strip 14 around the edge of the windshield 12. It should be clear that the molding 14 is used as a decorative means of covering the mounting of the windshield 12. The molding 14 is attached to the vehicle body 10 by a number of molding clips 16 which are located at spaced positions around the windshield. The molding clips 16 are best seen in FIGURES 2 and 3. As shown in FIGURE 2 the windshield 12 is positioned relative to the vehicle body 10 by a resilient spacer strip 18 and is sealed with an adhesive mounting substance 20, which may be of any type suitable for such use. This mounting substance 20 is used around the entire edge of the windshield 12 and serves to cushion the windshield 12 against bumps and jolts occasioned by the body 10 while also serving as a sealer material against possible leaks between the windshield and the body.

The molding clip 16 includes a relatively flat base 22 which has a compressible leg portion 24 extending from one side thereof and a resilient stud 26 extending from the opposite side. One end of the base 22 also serves as a cushioning spacer between the molding 14 and the body 10. The study 26 includes a pair of flexible portions 28 and 30 separated by a slot 32 and is adapted to be inserted through an aperture 34 in the body panel 10. The slot 32 allows the portions 28 and 30 to be compressed together so that they may pass through the aperture 34 whereupon they spread apart to retain the molding clip 16 to the body 10. The compressible leg 24 includes an intermediate shoulder 36, and a curved extension 38, which terminates in molding retaining fingers 40 and 42.

The molding 14 is of a standard shape having inturned flanges 44 and 46. Thus, it can be seen that the molding clip 16 has been adapted to conform to the shape of the molding 14 so that it resiliently holds the molding. The intermediate shoulder 36 abuts the inturned flange 46 so as to hold it between the base portion 22 and the compressible leg 24 of the molding clip 16 and the fingers 40 and 42 resiliently grasp the inturned flange 44 of the molding 14 to hold it to the molding clip 16. The finger 42 also serves as a cushioning spacer between the molding 14 and the windshield 12. The molding clip 16 may be made of any suitable resilient material so that its stud portion can be resiliently snapped into the aperture 34 in the body 10 so that the compressible leg 24 can be fit into the molding 14 so as to fasten the molding 14 to the clip 16. It is suggested that a very suitable material for this molding clip 16 is nylon.

Thus, this invention provides a one-piece molding clip for fastening a molding to a body panel around the edge of a windshield. This molding clip is easily attached in that it is assembled to the body panel by merely snapping a resilient stud through an aperture in the body panel and is fastened to the molding by merely fitting the molding over a resilient leg portion of the clip. The molding clip further cushions the molding against contact with the body panel and the windshield glass. Thus, this molding clip eliminates the problems associated with molding clips currently used to hold moldings around the edges of the fixed windows in vehicle bodies.

Although but one embodiment of the invention has been shown and described in detail, it should be clear to those skilled in the art to which the invention pertains that many changes and modifications may be made thereto without departing from the scope of the invention.

I claim:

In combination with a window frame and a window mounted in the frame by means of a mounting substance disposed between said window and frame, a channel-shaped molding strip having inturned flanges, said molding strip extending from said frame to said window around the edge of said window and covering said mounting substance, and a molding clip including a base portion lying against said frame at the edge of said window, a resilient stud portion integral with and extending from one side of said base portion through an aperture in said frame to hold said molding clip to said frame, and a resilient leg portion integral with and extending from said base portion, one flange of said molding strip being disposed between the base portion and the leg portion, the base portion constituting a cushioning spacer between the molding strip and frame, the leg portion including a shoulder engaging the said one flange to retain the molding, the leg portion also including a resilient extension terminating in a pair of fingers disposed on opposite sides of the other molding strip flange, one finger constituting a cushioning spacer engaged between the molding strip and the window, the frame defining an aperture to receive said stud portion.

References Cited

UNITED STATES PATENTS

| | | | |
|---|---|---|---|
| 2,933,779 | 4/1960 | Delaroche | 52—498 X |
| 3,059,292 | 10/1962 | Harris | 49—492 |
| 3,245,182 | 4/1966 | Zierold | 52—393 X |
| 3,274,740 | 9/1966 | Hall | 52—400 |

DAVID J. WILLIAMOWSKY, Primary Examiner.

KENNETH DOWNEY, Examiner.